March 31, 1970 E. L. GRUENBERG 3,504,112

TWO-DIMENSIONAL IMAGE DATA ENCODING AND DECODING

Filed Jan. 20, 1966 4 Sheets-Sheet 1

INVENTOR
ELLIOT L. GRUENBERG

BY Robert J. Lasker
AGENT

March 31, 1970 E. L. GRUENBERG 3,504,112

TWO-DIMENSIONAL IMAGE DATA ENCODING AND DECODING

Filed Jan. 20, 1966 4 Sheets-Sheet 2

| | | | | | | | |
|---|---|---|---|---|---|---|---|
| 000000 | 000001 | 000100 | 000101 | 010000 | 010001 | 010100 | 010101 |
| 000010 | 000011 | 000110 | 000111 | 010010 | 010011 | 010110 | 010111 |
| 001000 | 001001 | 001100 | 001101 | 011000 | 011001 | 011100 | 011101 |
| 001010 | 001011 | 001110 | 001111 | 011010 | 011011 | 011110 | 011111 |
| 100000 | 100001 | 100100 | 100101 | 110000 | 110001 | 110100 | 110101 |
| 100010 | 100011 | 100110 | 100111 | 110010 | 110011 | 110110 | 110111 |
| 101000 | 101001 | 101100 | 101101 | 111000 | 111001 | 111100 | 111101 |
| 101010 | 101011 | 101110 | 101111 | 111011 | 111011 | 111110 | 111111 |

FIG.3

FIG.4a

RUN LENGTH ENCODING OF 8 GRAY LEVEL WEDGE

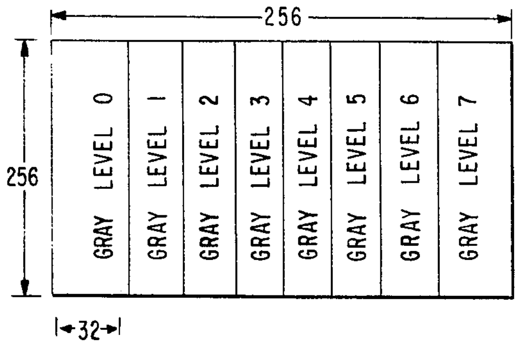

FIG.4b

TRANSMISSIONS:

BOBOBOBBBBBBBBBB FOR GRAY LEVEL 0

BOBOBIBBBBBBBBBB FOR GRAY LEVEL 1

BOBIBOBBBBBBBBBB FOR GRAY LEVEL 2

BOBIBIBBBBBBBBBB FOR GRAY LEVEL 3

BIBOBOBBBBBBBBBB FOR GRAY LEVEL 4

BIBOBIBBBBBBBBBB FOR GRAY LEVEL 5

BIBIBOBBBBBBBBBB FOR GRAY LEVEL 6

BIBIBIBBBBBBBBBB FOR GRAY LEVEL 7

March 31, 1970 E. L. GRUENBERG 3,504,112

TWO-DIMENSIONAL IMAGE DATA ENCODING AND DECODING

Filed Jan. 20, 1966 4 Sheets-Sheet 3

ADDRESS OF CHANGE TRANSMISSION (ACT) ENCODING

| CHANNEL | 1 | 2 | 3 | 4 | 5 | 6 | 7 | 8 | 9 | 10 | 11 | 12 | 13 | 14 | 15 | 16 | |
|---|---|---|---|---|---|---|---|---|---|---|---|---|---|---|---|---|---|
| | 0 | 0 | 0 | 0 | 1 | 0 | 0 | 0 | 1 | 0 | 0 | B | 0 | 1 | 0 | 0 | ← ORIGINAL CODE |
| | | | | | A | | | | B | | | C | | D | | | |

| | | | | | | | | |
|---|---|---|---|---|---|---|---|---|
| "1" | 1 | 0 | 0 | 1 | 0 | 1 | A | NEW CODE |
| "1" | 1 | 0 | 1 | 0 | 0 | 1 | B | NEW CODE |
| "B" | 1 | 1 | 1 | 1 | 0 | 0 | C | NEW CODE |
| TRANSMIT ORIGINAL CODE | 0 | 0 | 0 | 1 | 0 | 0 | | |

DESIGNATOR CHANNEL 3,504,112
TWO-DIMENSIONAL IMAGE DATA ENCODING AND DECODING

Elliot L. Gruenberg, Hartsdale, N.Y., assignor to International Business Machines Corporation, Armonk, N.Y., a corporation of New York Filed Jan. 20, 1966, Ser. No. 521,951
Int. Cl. H04n 7/12
U.S. Cl. 178—6 10 Claims

ABSTRACT OF THE DISCLOSURE

A method of encoding and decoding a coded image wherein symmetry comparisons are made of the data. This achieves simultaneous two-dimensional compression. The image is subdivided into elemental areas and data representative of each elemental area is generated. Superposition, by folding or sliding groupings of said areas over each other, is followed by comparisons to determine the positional symmetry of corresponding data.

This invention relates to the digital representation of two-dimensional images and more particularly to a method for encoding and decoding such images.

The transmission of two-dimensional images over communication media necessitates the translation of the image into a signal format such that it can be most effectively restored to its two-dimensional form at the receiver. Two-dimensional images are commonly scanned and converted from an analog representation into a digital representation of the image on a point-by-point basis. The elements of such a digital signal, representative of each elemental point of the image, usually identify one of a plurality of gray levels. Each individual gray level is associated with a particular brightness level. The number of gray levels selected to represent the varying brightness features of the image is dependent upon the contrast discrimination desired in the reproduction of the image at the receiver. It is recognized in the art that as few as two gray levels, or as many as sixty-four gray levels, may be required.

Such a digital representation contains large amounts of redundant information. For example, consider the instance where each elemental point of a two-dimensional image is represented by one of sixty-four gray levels. Each elemental point of the image would be characterized by a six-bit word to signify its gray level. A typical image may require some five hundred thousand or more elemental points to attain the necessary resolution. The digital signal is redundant as the image could be effectively reproduced without the transmission of all five hundred thousand elemental points, provided, of course, that some way could be used to indicate the successive occurrence of the individual gray levels for each elemental point.

Attempts have been made to reduce the redundant information without sacrificing the resolution of the reproduced image. Techniques such as run length encoding, previous element prediction, and adaptive compaction have been developed to achieve data compaction. Run length encoding has to be an effective method of data compaction during periods where the input data remains at a relatively constant level. However, this method is not very effective where the data is fluctuating or changing rapidly. It is for this reason that run length encoding lacks the necessary flexibility and versatility for many situations where data comparison is not only desirable, but essential, for the transmission of the image. Previous element prediction techniques and adaptive data reduction methods were developed in an attempt to overcome the shortcomings of run length encoding. These techniques, although providing some improvement over prior methods, have not completely resulted in an optimum encoding process, and require complex equipment to provide more efficient compaction than achieved by prior compaction systems.

These aforementioned and other techniques have been dependent on a one-dimensional analysis of the image characteristics. Common examples of one-dimensional analyses are the point-by-point and the line-by-line representation of the image characteristics. The method practiced with this invention departs from the previous or existing prior art methdos in that the image characteristics are examined, analyzed and encoded on a two-dimensional basis, which results in improved data compaction and other features and advantages described more fully hereinafter.

It is, therefore, a principal object of this invention to provide an effective method for reducing the redundancy in a digital signal representing any two-dimensional image.

It is a further object of this invention to reduce signal redundancy without sacrificing the resolution of the image reproduced at the receiver in an image data transmission system.

It is yet another object of this invention to provide an improved method of data compaction which is self-synchronizing.

It is still another object of this invention to provide a "quick-look" capability, i.e., to facilitate a more rapid identification of images at lower resolution with less channel capacity.

It is a more specific object of this invention to provide a method of data compaction especially adaptable to two-dimensional images comprising repetitive patterns or designs.

It is yet another more specific object to encode/decode in parallel an image to simultaneously reproduce all the characteristics of the image.

The foregoing objects are achieved in accordance with teachings of the subject invention bearing a unique encoding and decoding method wherein the two-dimensional image to be transmitted and reproduced is processed on an element-by-element basis in which the elements comprise variable geometric areas of the image. More specifically, according to one embodiment of the invention, the two-dimensional image is divided into elemental areas and successively folded upon itself. Subsequent to each "folding" the data in one half is examined and correlated with the data in the other half to determine the non-similarity or similarity of the gray levels. The finding of a similarity in each "fold" is denoted by specific code symbols. This process is repeated until the examination of the superimposed areas indicates a dissimilarity. If similarity does not exist at some point in the process, the two dissimilar portions of the image are treated as independent entities and a separate code generated for each portion.

In accordance with another embodiment of the invention, the two-dimensional image is successively subdivided into halves and subsequent to each division, the respective portions are superimposed by sliding one portion over the other. An examination is then made to determine the similarity or non-similarity of the two portions. The code is generated in the same manner as for the aforementioned "fold" technique.

A variation of these aforementioned embodiments incorporates a special complement symbol to provide increased image data compaction.

In accordance with yet another embodiment of the invention, the encoding of a two-dimensional image is accomplished by denoting the non-similarity of the address of an elemental area code from a previous area code. When such a dissimilarity occurs, the address of the change within the coded data is inserted into the transmission stream along with the denoted indication of the respective change. Where a dissimilarity occurs in the more frequently used low order bits of the code, the normal code is transmitted along with a denoted indication of this condition.

The foregoing and other objects, features and advantages of the present invention, will be more completely understood from the following description of preferred embodiments of the invention as illustrated in the accompanying drawings.

In the drawings:

FIG. 1 shows, in block diagram form, an exemplary application of the data compaction technique in an interplanetary data transmission system;

FIGS. 2*a–d* show representations of two-dimensional images and the digital codes indicative of each of the images;

FIGS. 2*af*, 2*bf*, 2*bc*, 2*cf*, 2*cc*, and 2*df* are codes generated for the images in FIGS. 2*a–d* in accordance with the present invention;

FIGS. 2*e*, *f* show two-dimensional image planes divided into sixteen elemental areas and the address matrix for the "cut" and "fold" method of encoding;

FIG. 3 shows a two-dimensional image plane divided into sixty-four elemental areas with the address code indicated for each one of the elemental areas;

FIG. 4*a* shows an eight gray level wedge;

FIG. 4*b* shows the code generated for each of the gray levels in accordance with a method of the invention;

DESCRIPTION OF SYSTEM APPLICATION

It is to be understood that the encoding and decoding of images in accordance with the teachings of the present invention is applicable to image data transmission via satellite or cable and to image storage techniques.

Figure 1:
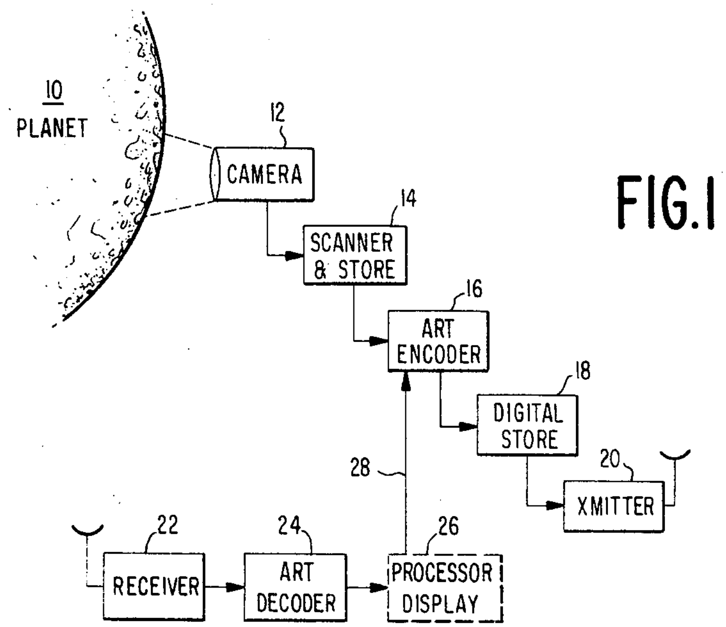

In the communication system shown in FIG. 1, it is desirous to obtain photographs of the surface of planet 10. The surface of planet 10 is photographed by camera 12 and the images obtained are subsequently scanned by scanner 14. Scanner 14 converts the two-dimensional images provided by camera 12 into digital binary signals indicative of the gray level of each elemental point of the image. The digitized information may be stored in scanner 14 for future use. Area recording and transmission encoder 16 interrogates scanner 14 to obtain the gray level information for the element points of the two-dimensional images stored therein. (Area recording and transmission.) ART encoder 16 operates on these signals in a manner to be more fully described hereinafter so as to generate a compact code representative of the two-dimensional images. If necessary, the generated code for each image can be stored in digital store 18 prior to being transmitted by transmitter 20.

The telemetry signals emitted by transmitter 20 are received by receiver 22. The coded signal is provided to area recording and transmission decoder 24 which functions to produce display control signals. These display control signals activate processor display 26 in order to cause it to regenerate the two-dimensional images of the surface of planet 10.

An advantageous capability to adjust the image encoding such that the image may be decoded to present preselected image characteristics is achieved via feedback channel 28 from processor display 26 to ART encoder 16. Feedback channel 28 serves to instruct encoder 16 to assemble the image code to include only certain preselected image characteristics while excluding other image characteristics. This provides additional transmission reduction by eliminating the need to transmit unwanted information. For example, the image data could be encoded such that only the higher order bits of each elemental area are utilized. This enables processor display 26 to reproduce the gross image characteristics which may be sufficient in many applications where details of the image are not particularly desired. Such "quick-look" resolution may serve to identify a ship at sea, a vehicle on a field, etc.

OPERATION

In accordance with the teachings of the present invention, a two-dimensional image is divided into a plurality of elemental areas. The number of elemental areas which is selected for any given image is dependent on the resolution that is desired. It is clear that an increase in the number of elemental areas will result in a greater degree of resolution. For the purposes of illustrating the encoding method of the invention, two image planes have been subdivided into sixteen elemental areas (see FIGS. 2*e* and 2*f*). Each of the individual elemental areas has been identified with a numeral; the numbering in FIG. 2*e* corresponding to that used in the so-called "cut" method of encoding, and the numbering in FIG. 2*f* corresponds to that used in the "fold" method of encoding.

Figures 2A, 2B, 2C, 2D:
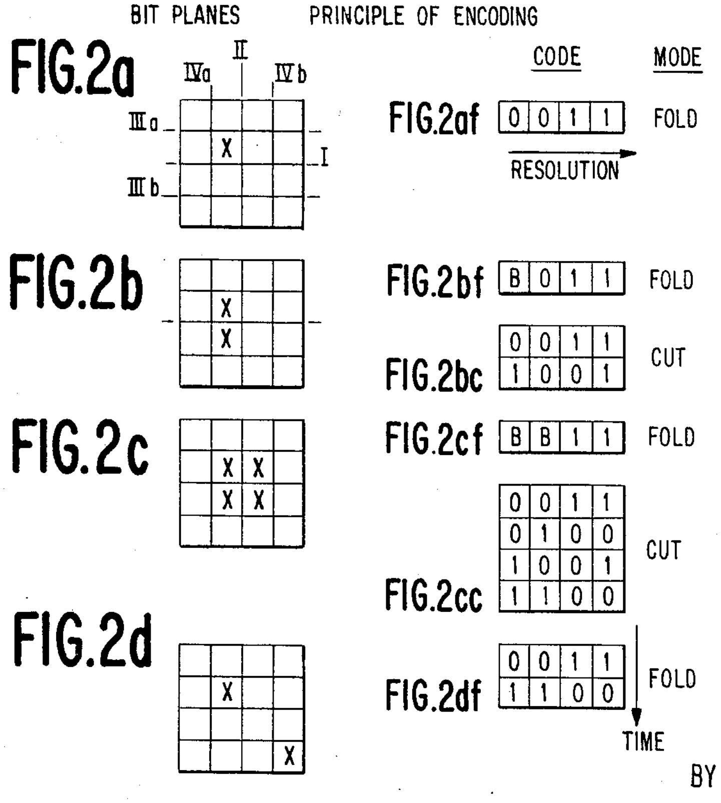

The Roman numerals shown in FIG. 2*a* identify the axis of the "fold" or "cut" in the order in which the "folds" or "cuts" are taken. Those skilled in the art will recognize that the axes for either method may be taken in any direction on the image plane. Coordinate systems (e.g., polar) other than rectilinear may also be used to provide reference means.

FIGS. 2*a–d* each show image planes subdivided into sixteen elemental areas. For the purpose of illustrating the encoding method, each of the image planes in FIGS. 2*a–d* has only two gray levels; i.e., black and white. In each instance the "*x*" represents a black area and the absence of an "*x*" indicates a white area. It is to be understood that the gray levels of the elemental areas could be obtained from the gray levels of the individual elemental points of the two-dimensional images by appropriately analyzing the image data and deriving a gray level for each elemental area. Indeed, as many prior art scanners operate on a point-by-point basis, the method of encoding on an elemental area basis requires only the rearrangement of the digital elemental point data prior to the actual encoding. Consequently, it is not necessary to have a scanner scan an image on an area basis to develop such information as it can be easily converted to an elemental area representation.

The encoding of the image in FIG. 2*a* begins with a "folding" of the upper half over the lower half about axis I. An analysis and comparison of each of the halves indicates that they are non-symmetrical. A "0" is written in the first bit position of the code to indicate the following: (1) the dark area lies in the upper half of the image; and (2) the two portions (i.e., the upper half and lower halves) of the image are not symmetrical (i.e., do not have identical gray levels). The analysis of the two halves also indicates that there is no formation of interest in the lower portion, and consequently a code does not have to be developed for that portion.

The upper right-half portion of the image is now folded, about axis II, over the upper-left portion, and a comparison made to detect the similarity or non-similarity of the gray areas. This analysis determines that a "0" should be placed in the second bit position of the code to indicate the following: (1) a black area lies in the upper left half of the image; and (2) the two portions just compared are not similar. The above comparison also indicates that there is no information of interest in the upper right-half portion of the image and, therefore, a code does not have to be generated for it.

The upper portion of the upper left quadrant of the image is now folded over the lower portion of the same quadrant about axis III*a*, and a comparison made for area similarity. A "1" is placed in the third bit position to represent the following:

(1) A dark area is present in the lower portion of the upper left quadrant; and (2) The upper and lower portions of the areas compared are not similar.

Figures 2E, 2F:
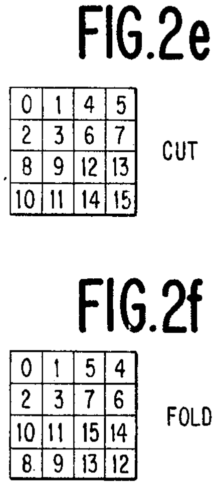

A fold is now made about axis IV*a* to compare the gray levels of each area which results in a "1" being placed in the fourth bit position of the code which indicates:

(1) The areas are not similar; and (2) The dark area exists in position 3 (FIG. 2*f*).

Repeating the above four steps of folding and comparison for the image in FIG. 2*b* results in the code indicated in FIG. 2*bf*. The symbol "B" in the first bit position of the code indicates that the upper and lower halves of the image about axis I are similar and symmetrical with respect to one another. The other bit positions in the code are like those generated for the image in FIG. 2*a*. The symbol "B" can be represented by a third level (ternary digital code) to distinguish it from either a "1" or a "0."

The "fold" method of encoding applied to the image shown in FIG. 2*c* results in the code "BB11" (shown in FIG. 2*cf*). The symbols "B" in the first two bit positions indicate that the two portions of the image that were compared are symmetrical, as can be shown by making a "fold" about axes I and II.

The description of the image shown in FIG. 2*d* requires the generation of two-four bit codes as is indicated. In that image the first "fold" about axis I, and the subsequent comparison and check for symmetry in the folded areas, indicates that there is a dark area of interest in the lower portion of the image. Consequently, unlike the image shown in FIG. 2*a* where there was nothing of interest in the lower portion, a separate code must be developed for the lower half of the image. This serves to illustrate one of the axioms of the encoding method; namely, that whenever a comparison indicates non-symmetrical areas, and there is information in both areas, then a separate code must be generated for each non-symmetrical portion of the image. Thus, the upper code in FIG. 2*df* represents the "*x*" in elemental area 3 (FIG. 2*f*). The lower code represents the "*x*" in the 12th elemental area (FIG. 2*f*).

An examination of the four sets of codes developed (i.e., those shown in FIGS. 2*af*, 2*bf*, 2*cf* and 2*df*) to describe each of the images shown in FIGS. 2*a–d*, indicates that the code inherently describes the address location of the gray level being described. This is illustrated by examining the two codes generated for the image in FIG. 2*d* and noting that the upper code in binary notation is 3 and the lower code is 12. These are the elemental area locations of the gray levels of interest as denoted in FIG. 2*f*.

A similar code can be generated to describe the images in FIGS. 2*a–d* in accordance with the "cut" principle of encoding. The essential difference in the "cut" method of encoding relative to the "fold" method, is that in the "cut" method the portions of the image are "slid" over one another at each axis rather than being "folded" over one another about each axis I–IV. The "cut" codes for FIGS. 2*b* and *c* are shown in FIGS. 2*bc* and 2*cc* under corresponding "fold" codes. The "0," "1," and "B" symbols retain the same significance for the "cut" code as for the "fold" code, but, as is illustrated, the codes will be different for any given image as the same elemental areas are not compared for symmetry after each "fold" or "cut."

The application of the "cut" principle of encoding to FIG. 2*b* requires the generation of two codes, whereas the "fold" principle of encoding describes the image in a single four bit code. The first step is to "slide" the upper portion of the image directly over the lower portion. A comparison of the two portions indicates a "0" in the first bit position to represent (1) that the dark area lies in the upper half portion; and (2) that there is non-symmetry between the two portions. This comparison also determines that since there is a non-similarity and that there is a dark area in the lower portion, another code must be generated for the lower portion to describe its content. Continuing with the upper portion, a cut is made on the axis II and the upper right-half portion slid over the upper left portion and a comparison made. The successive application of this principle results in the four bit code "0011."

Upon proceeding with the lower portion, the first bit position is occupied by a "1" which denotes (1) non-symmetry between the upper and lower portions; and (2) that the remainder of the code is describing the lower half portion of the image. Successive application of the "cut" principle for the lower portion results in the four bit code "1001."

A comparison of the "fold" code and the "cut" code reveals that in the application of FIG. 2*b*, the "fold" code is the more economical in the sense that it requires the transmission of less information to describe the two-dimensional image. This is more dramatically illustrated when the "fold" and "cut" codes are compared for the image in FIG. 2*c* where the "fold" method results in a four to one advantage over the "cut" method. However, the image shown in FIG. 2*d* would require the same number of code sets regardless of which method were used.

Those skilled in the art will recognize that in some instances the use of the "fold" principle of encoding will result in the generation of a lesser number of codes than will the application of the "cut" principle. Conversely, in some situations the "cut" principle of encoding will result in fewer codes then will the "fold" principle. However, in general, regardless of the principle used, the number of codes generated is dependent on the number of non-similarities which are detected by the respective technique in examining the elementary areas of the image.

The length of the code word generated by either method of encoding can be expressed by the following formula: $2^n = N$ where, $n$ is the bit length and N is the number of elemental areas into which the two-dimensional image is subdivided. For example, the subdivision of a two-dimensional image into sixty four elemental areas would require codes of six bit length.

The fact that each individual elemental area of a two-dimensional image is represented by a unique code designation is illustrated in FIG. 3 where each of the sixty four elemental areas is expressly characterized by a distinct combination of ones and zeros. The address or index of the elemental areas is in accordance with the "cut" method of encoding. A similar index or address matrix exists for the "fold" method, although it should be clear that each elemental area would be characterized by a different code than would a corresponding area of the image in accordance with the "cut" principle.

An important feature of the aforementioned encoding method is that of "quick-look" resolution. "Quick-look" resolution refers to a method of encoding/decoding an image such that certain pre-specified characteristics of the image may be reconstructed without the necessity of transmitting the entire code information. For example, a code may be formulated using only the higher orders bits of each of the code sets generated in accordance with the principles described, supra. An example of such an application is the identification of a large object in a given image. Such an identification could be obtained without the necessity of reconstructing the image in detail. Consequently, a considerable saving, in addition to that realized by other than the "fold" or "cut" principle of encoding/decoding, could be achieved as transmission could be ceased at that point where the resolution of the reconstructed image had enabled an identification to be made.

It is apparent that "quick-look" resolution may be considered from the standpoint of resolution ranking.

Specifically, the two-dimensional approach used in the encoding/decoding methods of the present invention are readily adapted to reconstruct the image in orders of increasing image resolution. Moreover, as the address of the individual elemental areas is inherent in the generated codes, specific portions of the image can be selected to be reproduced. Such area selection is achieved by forming a new code which includes only the data which describes the characteristics of the selected area. It is quite obvious that such a capability may result in considerable transmission reduction.

Although the principles of encoding were illustrated for an image having only two gray levels, namely black and white, it is to be understood that the method of coding described herein is applicable to an image having any number of gray level designations. FIG. 4*a* shows an eight gray level wedge which is fully described by the code shown in FIG. 4*b* using the "fold" principle of encoding. Only seven code sets were necessary to define the eight gray level as the eighth gray level is expressed by the other seven. The code for each gray level has sixteen bit positions which indicates that the eight gray level wedge was divided into $2^{16}$ or 65,536 elemental areas.

It is also significant to note that both the "cut" and "fold" method of encoding can be applied to an image regardless of whether the elemental areas of the image are described in terms of gray level planes or bit planes. A bit plane is defined as an assembly of the bits of the same order or significance for all of the elemental areas in a picture. A gray level plane is defined as a set wherein all the elemental areas of the same gray level are assembled. There is, however, an advantage in encoding a two-dimensional image using bit planes in that only three bit planes versus seven gray level planes are required to describe an image having eight gray levels.

DATA COMPACTION ENCODER/DECODER

The concept of a single symbol "B" to indicate similarity of gray level between two selected elemental or group of elemental areas of an image may be extended to a plurality of such symbols each representative of a unique image characteristic. The upper limit of the number of symbols employed is obviously dependent on the ability of the encoding/decoding equipment to discriminate between each of the signals designating the individual symbols. Thus, in a digital binary system as each of the symbols may be denoted by a different voltage level, it is apparent that the allowable number of symbols is dependent on detector sensitivity, voltage range available, presence of noise and its amplitude, etc. However, it is conceivable that as many as sixteen different symbols could be used with the present state of the art encoding/decoding equipment.

As an example of the use of additional symbols, consider a symbol "C," which denote the compliment of any given elemental or group of elemental areas in an image. For example, an image that is dissimilar in one-quarter, one-eighth, etc., of its elemental areas, but is otherwise all black, or all white, could be more effectively represented by using all black or all white designations in conjunction with the symbol "C." Thus, the code shown in FIG. 4*a* would be designated as "CBCC" rather than "OB11."

Figure 5:
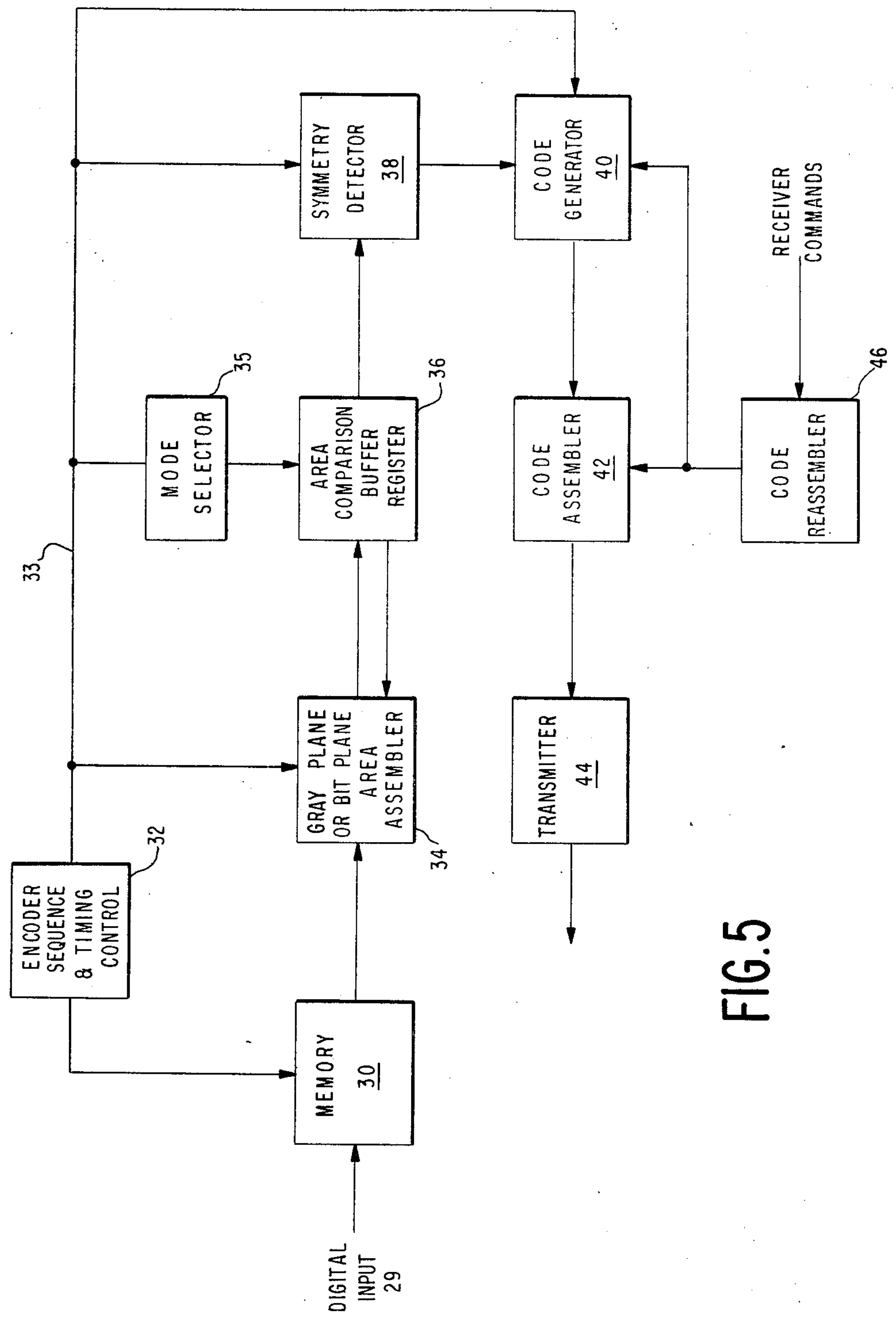
FIG. 5 is a block diagram representation of a data compaction encoder for generating an image code in accordance with the invention.

FIG. 5 shows, in block diagram form, an encoding apparatus for preforming the method of encoding described herein. A digital signal along input line 29, which represents the gray level information of a two-dimensional image on a point-by-point basis, is provided to memory 30 where it is stored until needed. Gray plane of bit plane area assembler 34 receives the image plane information from memory 30 under instruction encoder control 32 via channel 33. Encoder control 32 comprises the necessary timing and sequencing circuitry to govern the operation of all the component elements of the encoder in addition to memory 30 and assembler 34. It also controls the mode of operation of the encoder to establish either "fold" or "cut" encoding and is capable of being programmed to select either gray plane or bit plane encoding in conjunction with either "fold" or "cut" encoding. Gray plane or bit plane area assembler 34 converts the point-by-point information of the image into the necessary elemental area representation required by the encoder. It examines the individual points within the individual elemental areas and assigns each elemental area with a gray level. This could be accomplished by averaging the plurality of points within each area to determine the most representative gray level.

It is preferable that gray plane or bit plane area assembler 34 be provided with intermediate storage capability to facilitate the encoding operation.

The re-assembled gray level information from gray plane or bit plane area assembler 34 is extracted under control of encoder control 32 and provided to area comparison buffer register 36. Area comparison buffer register 36 compares the elemental areas in accordance with the principles described, supra, and provides gating signals to symmetry detector 38. Mode selector 35 is set to instruct area comparison buffer register 36 as to the mode of operation such as "cut" or "fold." Symmetry detector 38 determines each bit of the code from the output of area comparison buffer register 36. The codes are generated in code generator 40 and assembled for transmission in code assembler 42. The assembled codes are transmitted to a receiving station by transmitter 44 which forms no part of the present invention. Code reassembler 46 receives commands from the receiver (not shown) to instruct code generator 40 and code assembler 42 to change its mode of operation.

Figures 6, 7:
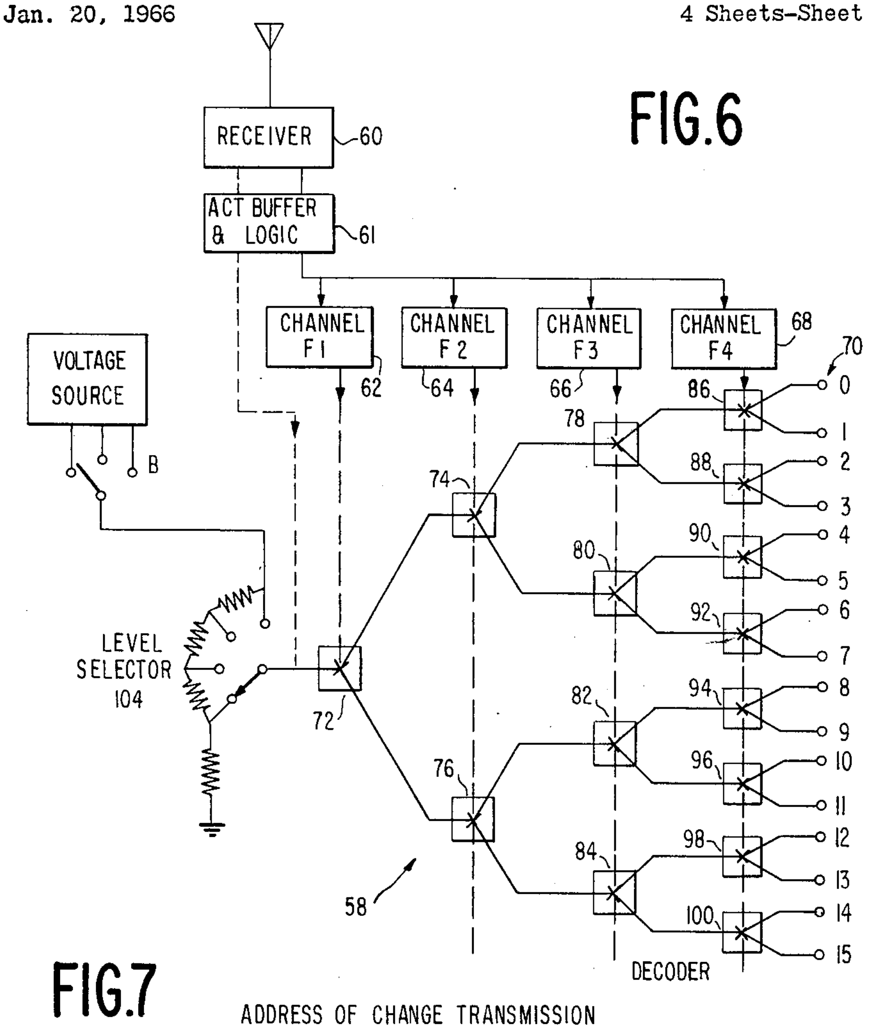
FIG. 6 is a diagrammatic representation of a decoder for producing, from the transmitted code, the necessary signals to activate a reproducing apparatus to reproduce the two-dimensional image.
FIG. 7 illustrates the manner in which a generated code may be modified in accordance with address change transmission encoding.

FIG. 6 illustrates an embodiment of a decoder to operate on the received codes to generate suitable signals to activate a display for reproducing the two-dimensional image. It is noted that neither the receiver nor the display device form any part of the present invention and hence a description of their operation is not herein presented. Those skilled in the art will recognize that both the receiver and display devices would have to be operationally compatible with the decoder. The decoder essentially comprises a whiffle-tree matrix 58. Whiffle-tree matrix 58 comprises switching elements 72–100 arranged as shown in the figure. The transmitted codes are received by receiver 60 and separated into the required number of channels. For the purpose of the present illustration, it is assumed that the image being transmitted has been divided into sixteen elemental areas, which requires four channels of information. In general, the number of control channels for the whiffle tree matrix will be determined by the following formula: $2^n=N$ where, $n$ is the number of bit positions in each of the assembled code sets and N is the number of elemental areas. The number of control channels thus corresponds to the number of bit positions in each of the assembled codes. Channel selectors 62–68 operate to control the switching of switches 72–100 of whiffle-tree matrix 58. Switches 72–100 should be responsive to a ternary signal such that symmetry signal "B" will be sensed by whiffle-matrix 58.

To illustrate the operation of the decoder, the two-dimensional image shown in FIG. 2*a* will be reconstructed. That image is represented by the "fold" code of 0011." This code is distributed to channels 62–68 in the following manner. Channel 62 receives the most significant bit, "0." Channel 64 receives the second-most significant bit, "0." Channel 66 receives the third-most significant bit, "1." Channel 68 receives the fourth-most significant bit "1." Switch element 72 is responsive to a gate signal from channel 62 and serves to set switch elements 74 and 76. The "0" in channel 64 causes switch element 74 to be activated which in turn sets switch elements 78–84. The "0" in channel 66 results in the activation of switch element 78 which sets switch elements 86–100. Channel 68 activates switch element 88 to cause an output signal to appear at channel 3 of selector station 70. The intensity or level of the signal at any of selector stations 70 can be controlled by controlling level sector 104 in accordance with the gray level code being received by receiver 60. The output signals appearing at the channels of selector station 70 can then be used to control a suitable display unit.

The operation of the decoder shown in FIG. 6 for the situation where the code contains a symmetry bit "B" can be illustrated using the "fold" code shown in FIG. 2*bf*. The reception of the symmetry bit "B" is passed to channel 64 by ACT buffer and logic 61 such that switch 76 is activated to set switches 82 and 84. This occurs prior to the activation of channels 62–68 such that when the code "B011" is passed to channels 62–68 it will result in a signal appearing at channel 11 of selection station 70 as well as channel 3 as in the previously described example.

ACT buffer and logic circuit 61 also informs the encoder of the mode of encoding that has been received. ACT buffer and logic circuit 61 performs the necessary functions to decode the signal to provide output instructions to the display unit (not shown) when ACT transmission is being used.

FIG. 7 illustrates a modification of the encoding method to provide a more flexible a more flexible and efficient means of transmitting digital information. The modification is based on the principle that infrequent changes of symbols occurring in the higher order or more significant bits of the code can be denoted by the address of such changes. In accordance with this embodiment a sixteen bit code would require a four bit code to denote the address of any change. A feature of this technique is that it can designate the infrequent location of the symmetry symbol "B."

As shown in FIG. 7, the modified code provides two designator bits to indicate a change in the transmitted code. The remainder of the code bits provide information indicating the address of the change. In the sixteen channel code there are changes in channels 5, 9, 12 and 14. For this particular code the receiver would be instructed that in the absence of any change signal a "0" has been transmitted. To indicate the "1" in channel 5, a "1–0" would be transmitted in the designator bit channels of the new code and the remaining bits would be "0101" to designate the address channel of the change. The receiver would then revert to its original mode and indicate the reception of "0's" for channels 6, 7 and 8. The "1" in channel 9 would be designated by a "1," "0" in the designator bits of the new code; the remaining bits would be "1001" to designate the change in channel 9. The receiver would again revert to its original mode to "receive" "0's" in channels 10 and 11. The occurrence of the symmetry signal in channel 12 would be denoted by one in the first two bits followed by "1100" to designate the channel in which the change of symbol "B" occurred. It is to be noted that the use of the longer address word results in a transmission savings only only when the changes in the code are infrequent. It should also be recognized that address change of transmission encoding is not limited to symbol "B" but may include other symbols such as symbol "C." The address word may be expanded to incorporate an increased number of symbols.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of encoding a two-dimensional image in a data image transmission system, comprising the steps of:

subdividing said image into a plurality of individual elemental areas to form a matrix;

assigning individual ones of said plurality of elemental areas a unique binary code which identifies the position of each individual elemental area within said matrix, wherein each of the unique codes for individual ones of said elemental areas are shortened by dropping high resolution bits prior to modifying said unique codes such that the resolution of said image characteristics is determined by the amount each unique code is shortened whereby said image characteristics can be decoded in successive orders of resolution;

generating at least one signal representative of the image characteristics associated with said individual ones of said elemental areas;

superimposing, in a predetermined order, pre-selected groupings of said elemental areas;

comparing said representative signals of said superimposed areas to determine the symmetry of the respective preselected groupings of said elemental areas;

and modifying said unique codes from the successive symmetry comparisons to form a code set of symbols to represent the image characteristics wherein the number of code sets generated is determined by the number of non-corresponding symmetries of said pre-selected groupings of said elemental areas.

2. A method of encoding a two-dimensional image in data image transmission system, comprising the steps of:

subdividing said image into a plurality of elemental areas;

generating a gray level characteristic representative of each one of said plurality of elemental areas;

superimposing, in a predetermined order, preselected groupings of said elemental areas;

compressing in two dimensions said gray level characteristics by successive symmetry comparisons of said gray level characteritics within said preselected groupings;

generating a code from said successive symmetry comparisons to represent predetermined characteristics of said image wherein the identity of the elemental areas is inherent in the code and number of code sets within said code is determined by the number of non-corresponding symmetries of said preselected groupings of said elemental areas.

3. The method of claim 2, wherein said successively chosen groupings comprise decreasing numbers of elemental areas.

4. The method of claim 2, wherein selected pairs of said groupings of said elemental areas are successively folded over one another to superimpose pre-selected groupings of said elemental areas.

5. The method of claim 2, wherein selected pairs of said groupings of said elemental areas are successively slid over one another to superimpose pre-selected groupings of said elemental areas.

6. The method of claim 2, wherein a change from a pre-selected bit designation in successive bits of the code is donated by the formation of an additional code which describes the location of the elemental area wherein said change occurred and the difference between said pre-selected code symbols and successive occurring code symbols of said image.

7. A method of encoding a two-dimensional image in a data image transmission system, comprising the steps of:

subdividing said image into a plurality of elemental areas;

generating a gray level characteristic representative of each one of said plurality of said elemental areas;

superimposing, in a predetermined order, preselected groupings of said elemental areas;

comparing the location symmetry of said gray level characteristics about a succession of axes;

generating a code from the successive symmetry comparisons to represent predetermined characteristics of said image wherein the identity of the elemental areas is inherent in the code and the number of code sets within said code is determined by the number of non-corresponding symmetries of said preselected groupings of said elemental areas; wherein said successive symmetry comparison compare preselected groupings of diminishing size.

8. The method of claim 7, wherein selected pairs of said groupings of said elemental areas are successively folded over one another to superimpose pre-selected groupings of said elemental areas.

9. The method of claim 7, wherein selected pairs of said groupings of said elemental areas are successively slid over one another to superimpose pre-selected groupings of said elemental areas.

10. The method of claim 7, wherein a change from a pre-selected bit designation in successive bits of the code is denoted by the formation of an additional code which describes the location of the elemental area wherein said change occurred and the difference between said preselected code symbols and successive occurring code symbols of said image.

References Cited

UNITED STATES PATENTS

| | | | |
|---|---|---|---|
| 3,294,896 | 12/1966 | Young | 178—5 |
| 3,305,841 | 2/1967 | Schwartz. | |
| 3,347,981 | 10/1967 | Kagan. | |
| 2,922,840 | 1/1960 | Lally. | |
| 2,978,535 | 4/1961 | Brown. | |

ROBERT L. GRIFFIN, Primary Examiner

J. A. ORSINO, JR., Assistant Examiner

U.S. Cl. X.R.

178—618, 7.1, 7.3; 325—38